Aug. 3, 1965 C. E. BROOKS ETAL 3,198,887

DISTRIBUTED TELEPHONE LINE CONCENTRATOR

Filed Nov. 20, 1961 9 Sheets-Sheet 1

INVENTORS C. E. BROOKS W. C. SAND

BY S E Hollander

ATTORNEY

Aug. 3, 1965    C. E. BROOKS ETAL    3,198,887

DISTRIBUTED TELEPHONE LINE CONCENTRATOR

Filed Nov. 20, 1961    9 Sheets-Sheet 2

INVENTORS C. E. BROOKS
W. C. SAND
BY
S E Hollander
ATTORNEY

Aug. 3, 1965 C. E. BROOKS ETAL 3,198,887

DISTRIBUTED TELEPHONE LINE CONCENTRATOR

Filed Nov. 20, 1961 9 Sheets-Sheet 3

INVENTORS C. E. BROOKS
W. C. SAND
BY S E Hollander
ATTORNEY

DISTRIBUTED TELEPHONE LINE CONCENTRATOR

INVENTORS C. E. BROOKS
W. C. SAND
BY S E Hollander
ATTORNEY

DISTRIBUTED TELEPHONE LINE CONCENTRATOR

INVENTORS C. E. BROOKS
W. C. SAND
BY S E Hollander
ATTORNEY

Aug. 3, 1965 C. E. BROOKS ETAL 3,198,887

DISTRIBUTED TELEPHONE LINE CONCENTRATOR

Filed Nov. 20, 1961 9 Sheets-Sheet 6

INVENTORS C. E. BROOKS
W. C. SAND

BY S E Hollander

ATTORNEY

DISTRIBUTED TELEPHONE LINE CONCENTRATOR

Filed Nov. 20, 1961

INVENTORS C. E. BROOKS
W. C. SAND
BY
SE Hollander
ATTORNEY

DISTRIBUTED TELEPHONE LINE CONCENTRATOR

Filed Nov. 20, 1961

INVENTORS C. E. BROOKS
W. C. SAND
BY
SEHollander
ATTORNEY

DISTRIBUTED TELEPHONE LINE CONCENTRATOR

Filed Nov. 20, 1961

INVENTORS C. E. BROOKS
W. C. SAND
BY S E Hollander
ATTORNEY

United States Patent Office 3,198,887

Patented Aug. 3, 1965

3,198,887
DISTRIBUTED TELEPHONE LINE CONCENTRATOR

Chester E. Brooks, Montvale, and William C. Sand, Chatham, N.J., assignors to Bell Telephone Laboratories, Incorporated, New York, N.Y., a corporation of New York Filed Nov. 20, 1961, Ser. No. 153,468
21 Claims. (Cl. 179—18)

This invention relates to space division telephone switching systems and more particularly to telephone line concentrators adapted to process intraconcentrator calls by coupling the calling and called substations to the same concentrator trunk.

In the recent past, telephone line concentration has become a subject of increasing emphasis in telephone switching practices. Line concentration is a system of telephone switching which includes "concentrating" at a remote location a relatively larger number of telephone substation lines over a smaller number of concentrator trunks to the central office, the obvious goal being the elimination of the necessity to extend each substation over a separate line to the telephone central office. Since concentration ratios of five-to-one are not extraordinary, the resultant savings in copper and other outside plant costs are significant, more so in view of the enormous investment in outside telephone plant.

Recent advances in the field of line concentration have been made with a view toward overcoming inefficiencies of certain prior concentrator units. An example of an advanced type of concentrator unit is shown in an application of Brooks-Crofutt-Henry-Sand, Serial No. 79,415, filed December 29, 1960, now Patent No. 3,123,674 of March 3, 1964. In the later disclosure an arrangement is proposed in which the remote line concentrator is literally distributed throughout the field with a portion or switching package individual to a particular substation being located proximate to each individual substation location. This is in lieu of extending each substation line directly to a centralized remote concentrator unit from which the concentrator trunks extend to the central office. The advantages in "distribution" include overcoming the prior inexorable requirement of extending every substation line directly to the "centralized" remote line concentrator. Viewed in proper context, telephone switching technologists will observe that the stringency of the requirement for connecting each line to the centralized remote concentrator is analogous to the rigid requirement of connecting each line to the central office in pre-concentrator practices. Since it was the latter disadvantage that gave rise to line concentration, the analogous practice of extending each line to a centralized concentrator is manifestly an atavistic and partially self-defeative practice and may be easily visualized by considering that the centralized remote line concentrator unit has in effect become a central office in microcosm (with regard to the lines directly connected to it).

Nevertheless, although completely operative and useful distributed line concentrators persist in the continuance of what would appear to be an outstanding inefficiency in concentrator practice and yet heretofore has been given merely passing recognition. In particular, this involves the connection of one concentrator subscriber to another connected to the same concentrator over two distinct and independent concentrator trunks. Under these circumstances, and in a centralized line concentrator as well as in a distributed line concentrator, an intraconcentrator call involves the extension of a calling subscriber over a concentrator trunk to the telephone central office and through the switching equipment at the office. Thereafter, the circuit may be further traced, in a typical call, over a conventional intraoffice trunk in the central office and through additional switching equipment out over a terminating concentrator trunk and the remote switching unit to the called subscriber. This rather lengthly succession of expensive switching devices and channels is necessitated for each intraconcentrator call. The plight is presented in sharpest relief when it is considered that the two concentrator subscribers may be physically located in close proximity to each other, perhaps in adjacent houses or even in the same apartment house.

The difficulty is particularly acute in connection with line concentration in view of the literal "sharing" of concentrator trunks by the concentrated lines. Thus, where there is a reasonably expectancy of substantial intraconcentrator traffic, efficiency may be considerably impaired. Using the five-to-one ratio adverted to above, if fifty subscribers are connected over ten trunks to the telephone central office, only five intraconcentrator calls can be processed simultaneously since two trunks are required for each call.

Indeed, in most line concentrators, the remaining forty subscribers are completely deprived of service and if an attempt to initiate an originating call is made by any subscriber, he will be afforded a "dead" line, i.e., he will not receive dial tone.

Previous efforts to overcome this problem of duplication of concentrator paths to the central office by the calling and called subscribers have often involved the use of expensive memory facilities to identify the lines as being connected to the same concentrator. Since these facilities are not required otherwise, their inclusion would be solely for the purpose of attacking the problem of intraconcentrator calls and the attendant expense considerably diminishes the financial benefits afforded by line concentrators, per se.

These prior attempts have also involved the provision of separate intraconcentrator trunks to which the calling and called subscribers may be coupled in lieu of providing a path to the office. This type of arrangement evokes a new series of difficulties since the problem arises as to how to supervise the intraconcentrator connection once established over the intraconcentrator trunk (for hangup, etc.) in view of the electrical isolation of the substation lines in a concentrator from the central office.

In is therefore an object of this invention to provide intraconcentrator switching capabilities which preclude the necessity of utilizing a separate concentrator trunk for originating and terminating connections.

An additional object of this invention is to preclude the necessity of providing special intraconcentrator trunks for coupling calling and called subscribers on intraconcentrator calls.

A further object of this invention is to provide intraconcentrator detecting facilities which do not require extensive memory capabilities in the central office.

Still another object of this invention is to provide intraconcentrator calling capabilities wherein a single concentrator trunk is utilized for the originating and terminating connection.

A further object of this invention is to provide intraconcentrator switching capabilities wherein the intraconcentrator call is initially completed over two separate concentrator trunks and thereafter the trunk utilized in the terminating connection is completely released.

Still another object of this invention is to provide intraconcentrator calling capabilities where the terminating trunk thus released is immediately available to service additional calls.

Heretofore one of the most significant obstacles in servicing intraconcentrator calls was the necessity of identifying the call as an intraconcentrator type. Thus prior to the ability to release any of the "higher level" paths (trunks) to the central office used in an intraconcentrator call, it is essential to determine that a call between two substations connected to the same concentrator, in fact, exists.

In some instances heretofore, the procedure for establishing this identification was predicted on sophisticated comparator facilities which examined the calling and called substations. Generally, this undertaking required access to extensive memory facilities which stored all of the information pertaining to the identities of substations connected to particular concentrators. It is at once apparent that the facilities necessary for establishing the existence of an intraconcentrator call using this procedure are intricate and costly. The latter disadvantages are reinforced when it is considered that these facilities are introduced exclusively for servicing intraconcentrator calls and would be otherwise unnecessary. Thus, to the extent that the overall cost of the concentrator is increased by the added equipment, the financial benefits which accrue in specially servicing intraconcentrator calls are neutralized.

In part, one of the primary difficulties in establishing the existence of intraconcentrator calls derives from the relatively prosaic approach taken to resolve the problem. In essence, this comprised comparing various substation identifications with other substation identifications by consulting memory facilities which stored entire blocks of information relating to these substations.

It is therefore an object of the present invention to provide for the detection of intraconcentrator calls without the necessity of providing unique comparator or memory facilities therefor.

It is still another object of this invention to provide for the detection of intraconcentrator calls without adverting to the identities of the substations involved in the call.

These and other objects of the invention are achieved in an illustrative embodiment in which the initial portion of a call between subscribers connected to the same concentrator proceeds conventionally. Thereafter the connection between the terminating subscriber and his associated trunk is released and in lieu thereof the called subscriber is connected to the same concentrator trunk which extends to the calling subscriber. Intercommunication between the calling and called subscribers then proceeds over the single trunk with supervision for disconnect being performed at the central office in the conventional manner.

In operation, subscriber A seeking to effect a connection to subscriber B connected to the same concentrator is first granted a connection to the central office over an idle concentrator trunk. In the illustrative embodiment disclosed herein, the concentrator circuit is arranged to work in combination with a conventional No. 5 crossbar telephone office as disclosed in Patent 2,585,904 to A. J. Busch of February 19, 1952. As a result of the connection to the central office, the calling subscriber in accordance with conventional No. 5 crossbar practice is granted access over a line link frame and a trunk link frame to an originating register. The subscriber proceeds in the usual manner to dial the digits of the called directory number. After completion of registration of all of the dialed digits in the originating register, a marker is summoned and the information respecting the called line directory number and the calling line equipment number is transferred thereto. At this time the marker releases the concentrator tunk utilized in the dial-tone portion of the call, i.e., the trunk over which the called directory number was dialed, and establishes a channel to the called line number in the conventional manner. Since concentator circuitry is involved, and more particularly a universal concentrator of the distributed type as disclosed in the above-referred-to application, the attempt by the marker to establish a channel to the vertical of the called line on the line link frame instead extends a connection over an idle trunk to the appropriate substation line as described in detail herein, and remote switching facilities individual to the line and trunk are operated to complete the connection to the called line.

The marker then proceeds to establish the "call-back" portion of the call by re-establishing a channel to the calling line and completing the two channels over an intraoffice trunk circuit. If the called line is free, ringing is initiated and tripped by the called substation going off-hook, and a tone is applied to the trunk connected to the called line. Additional apparatus connected to all of the other busy trunks is adapted to respond to the appearance of tone thereon by operating a detecting device. In short, the existence of an intraconcentrator call is detected simply by marking one of the two trunks involved in the call with a tone frequency and examining each of the other trunks for appearance of the tone. Since, in an intraconcentrator call, the two trunks are interconnected, that trunk on which the tone is detected is obviously the remaining trunk and indicates, as well, that an intraconcentrator call is in effect.

Additional circuitry in the concentrator control equipment recognizes the existence of the intraconcentrator call and proceeds to disestablish the connection between the called line and the concentrator trunk used on the teminating connection. Thereafter, the called line is connected to the same trunk utilized on the call-back portion of the call to which the calling line is still connected. At this time the subscribers are interconnected over the single trunk utilized in the call-back portion of the call and the trunk originally used for the terminating portion of the call is free to serve other calls including intraconcentrator calls.

A feature of this invention is an intraconcentrator detecting circuit including means for applying identifying tones to concentrator trunks and detecting for the presence of said tones on other trunks.

An additional feature of this invention includes facilities for connecting a calling and called line to the same concentrator speech trunk.

Still another feature of this invention includes intraconcentrator detecting equipment in which the application of identifying tone to a trunk in a particular concentrator cannot be detected on a trunk connected to another concentrator in the same office.

Still another feature of this invention is to provide for transferring a called substation from a terminating concentrator trunk to the same concentrator trunk to which the calling party is connected without either party being aware thereof.

A further feature of this invention includes facilities for supervising disconnect indications on substation lines connected to the same trunk on a intraconcentrator call by supervising the trunk circuit.

These and other objects and features of the invention are achieved in an illustrative embodiment in which:

FIG. 1A shows an outline diagram of the circuitry involved in the "dial-tone" portion of an intraconcentrator call;

FIG. 1B indicates in outline form the circuitry involved in an intraconcentrator call;

FIG. 2 shows in schematic form a typical remote switching facility;

FIG. 3 includes a portion of the control equipment at the central office including the individual trunk relays;

FIG. 4 shows the number group detecting circuitry as well as a portion of the circuits for marking the trunks;

FIG. 5 indicates a portion of the line link frame and also equipment for initiating intraconcentrator detection operations;

FIGS. 6 and 7 include the intraconcentrator detecting and control circuitry;

GENERAL DESCRIPTION OF OPERATION—INTRACONCENTRATOR CALL

1. *Dial tone connection*

Figure 1A:
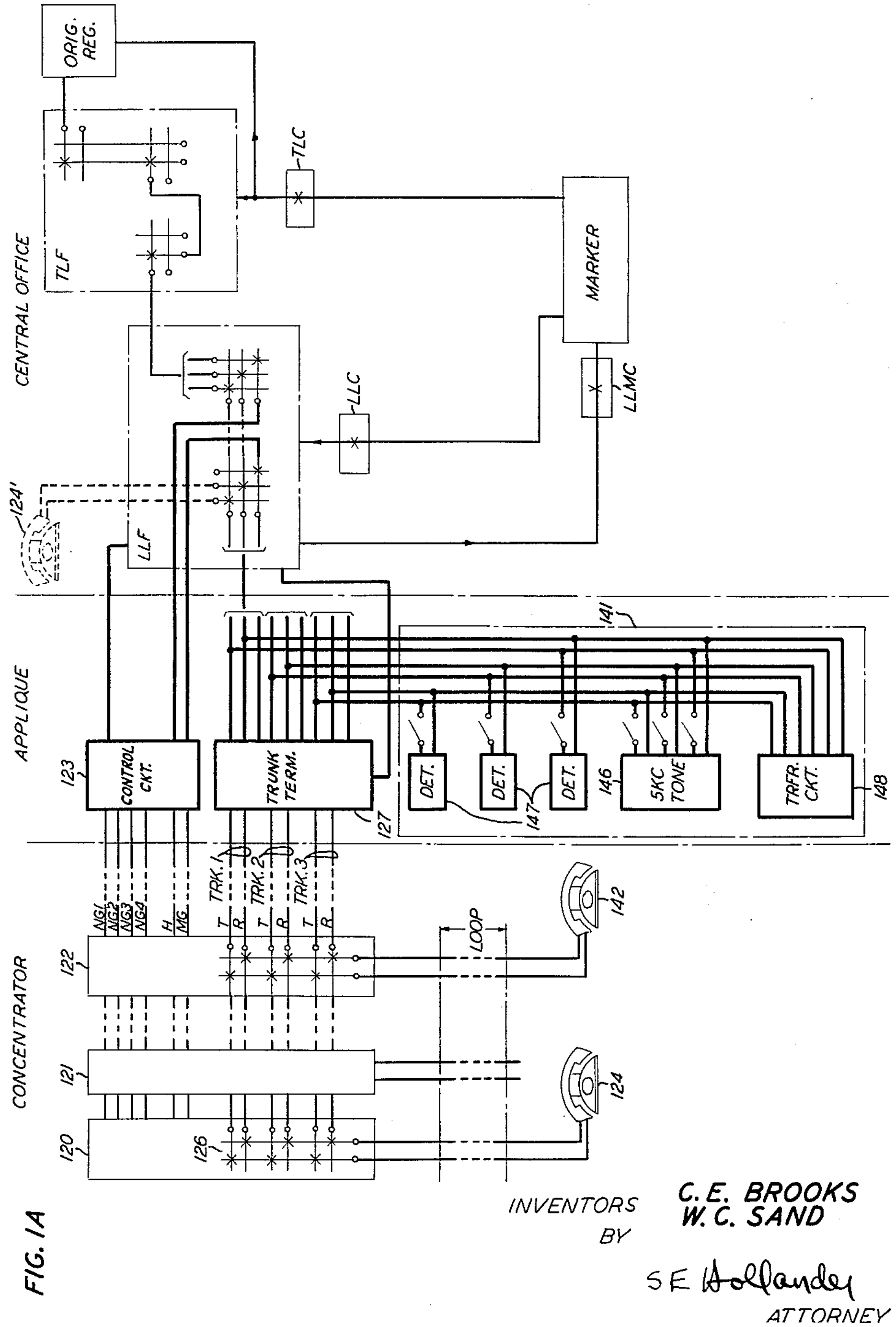
Figure 1B:
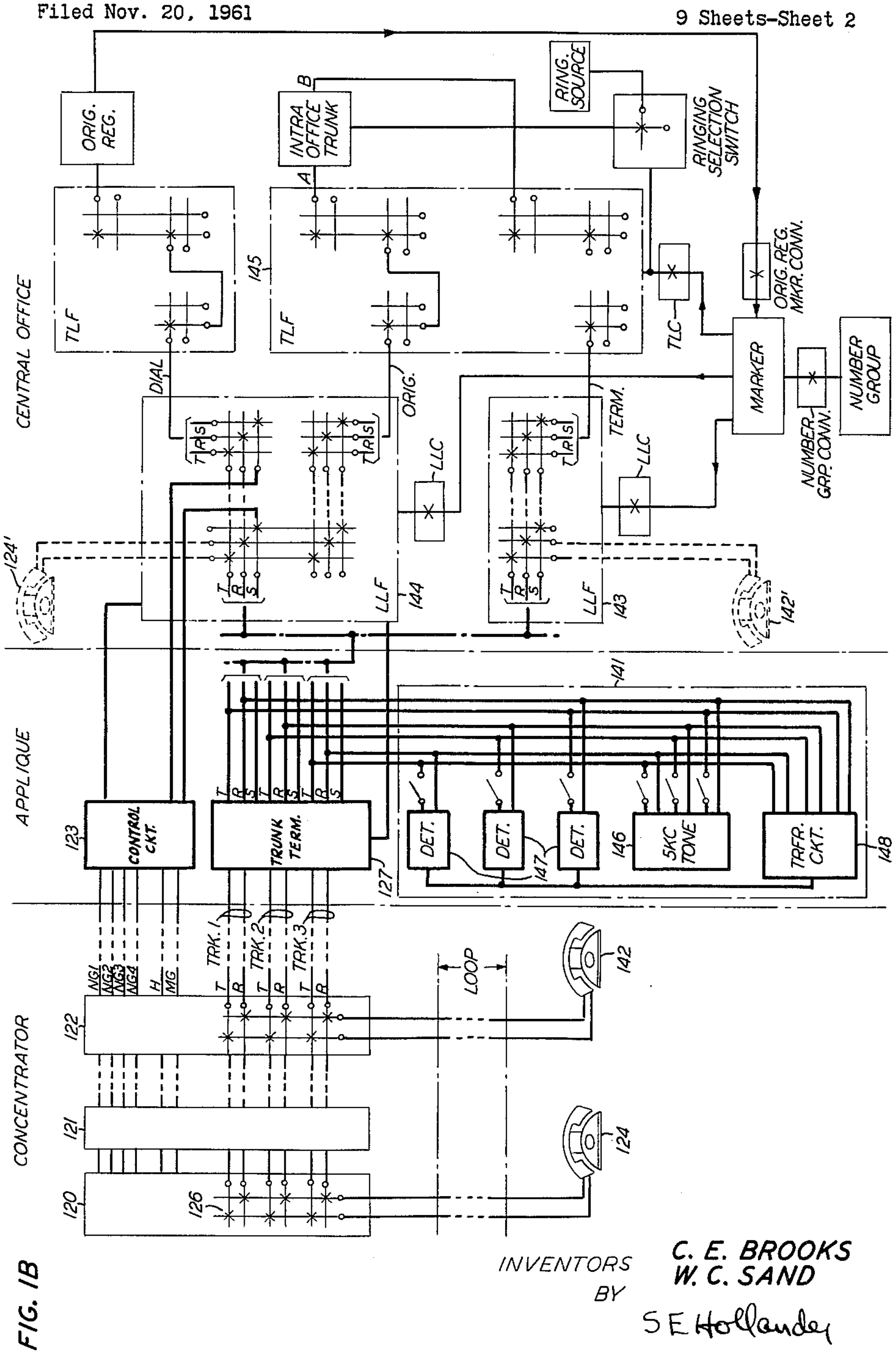

In accordance with a specific illustrative embodiment of the present invention, a distributed line concentrator is shown in combination with a conventional No. 5 crossbar telephone system. Since the No. 5 crossbar equipment is largely unchanged, the concentrator may be classified as a "universal" type. As shown in FIG. 1A, the concentrator includes a group of packages 120, 121, and 122 which are individual to the substations, only two of which, substations 124 and 142, are shown. At the central office an applique circuit including control facilities 123, trunk termination 127, and intraconcentrator control circuit 141 is shown. The applique circuit including the control facilities 123 and trunk termination 127, though shown in outline form in FIGS. 1A and 1B, is shown in detail in FIGS. 3–8. The conventional No. 5 crossbar equipment is shown in dotted outline in the central office. As described in detail in the above-referred-to application of Brooks-Crofutt-Henry-Sand, the points of junction between the concentrator trunks or applique circuit and the central office equipment include the horizontal channel of the crossbar switch in the line link frame. Although the line relays are not shown (in FIG. 1A), it is understood that an individual line relay in the central office is provided for each substation line in accordance with conventional practice. These relays are shown, for example, in the detailed description as relays 5L1–5L6.

The manner of entrance by the concentrator substation 124 on an originating call is through actuation of the line relay. This has been done intentionally to preserve the physical integrity of the No. 5 crossbar telephone office and, moreover, to enhance the universality of the concentrator.

To facilitate comprehension of the detailed description which follows, the advantageous manner in which the distributed line concentrator is operated in combination with the No. 5 crossbar telephone system will be disclosed generally. For preservation of clarity, only those aspects of the No. 5 system essential to an understanding of the present invention are included. For a comprehensive description of the operation of the No. 5 crossbar system, reference may be made to the above-identified Busch patent.

FIG. 1A is an outline diagram of the concentrator apparatus as combined with the No. 5 crossbar system during an originating or so-called "dial-tone" call. The line packages 120, 121, and 122 are each connected to two of the No. 4 group leads NG1–NG4 in accordance with a code as described in the above-referred-to Brooks et al. application. Each of these packages is connected, moreover, to a ground or number group conductor MG and the common hold or battery lead H.

A number of speech trunks of which three are shown are connected to each of the line packages. The number group leads terminate at the central office in a control circuit 123 used for identifying substations which originate service requests and for additional control operations. It is seen from the drawing that trunks 1–3 are extended to the horizontal levels of crossbar switches in the line link frame.

In describing the operation of the invention it will be assumed that a calling party at substation 124 connected to line package 120 is seeking to effect a connection through the central office to a subscriber 142 connected to the same concentrator through package 122. In establishing a dial-tone connection, as described in FIG. 1A, removing the receiver from the switchhook at substation 124 causes current to flow through particular number group leads NG1 and NG2 connected through line package 120 to substation 124 as explained in the detailed description which follows. For purposes of explanation it will be noted that the remaining substations, also as explained herein, are connected to differing combinations of the number group conductors to specifically identify those substations.

The current which flows in number group conductors NG1 and NG2, as described above, due to the off-hook condition at substation 124 is detected in the central office in applique circuit 123. In essence, the identification of the calling substation at substation 124 results in the operation of a line relay (shown in detail in FIG. 5) uniquely associated with the calling line. In response to the operation of the line relay, the line link frame LLF is actuated to inform the line link marker connector LLMC that a marker is required. The line link marker connector selects an idle marker and transmits to the marker the identity of the calling line. The marker then proceeds to determine the line link frame number and the location of the line on the frame and also whether an idle register is available and if a channel can be established between the line and the originating register. When the marker selects a trunk link frame having an idle register connected thereto, it also selects an idle channel between the subscriber line and the originating register. Having found the idle channel, the marker operates select and hold magnets required to close through the channel to the originating register. Thereafter the marker releases its associated connectors and itself, and the register now furnishes dial tone to the subscriber and is ready to receive the digits which are dialed. The digits which the subscriber dials are registered in the originating register and when dialing is completed, the originating register seizes a marker and transmits the registration to it. Thereafter the operating sequence is as described herein with respect to the establishment of an intraoffice call as disclosed infra for FIG. 1B.

While the description above covers the operation of a No. 5 crossbar system in general, it is equally applicable to the present invention with the exception that the attempt by the marker to establish a channel between the calling substation and the originating register results in the operation of control equipment in the applique circuit to extend the connection out into the field and to operate the remote crosspoints in line package 120.

Thus during the course of its operation, the marker seeks to establish a connection to substation 124 which it "believes" is connected, as shown in dotted outline for substation 124', to the vertical of the crossbar switch on the line link frame. As explained in detail in the above-referred-to Brooks et al. application, the substation line is not connected to the vertical of the switch, and instead, the horizontal of the crossbar switch is connected over a concentrator trunk into the field. In lieu of connecting the subscriber substation conventionally as shown for substation 124', the substation is connected through the crosspoints of package 120 to trunk 1, for example, as shown for substation 124. Trunk 1 is extended to the horizontal channel of the crossbar switch on the line link frame. As a result, during the conventional operation described above when the marker sought to effectuate the horizontal channel to the equipment location of substation 124, equipment in the applique circuit 123, as explained in detail herein, is energized to extend the trunk and effectuate a connection between the substation 124 and the trunk by applying a marking potential to the number group leads NG1 and NG2 unique to that substation and simultaneously apply a marking potential to the tip conductor of the selected trunk 1. A particular crosspoint 126 is energized by the marking potential to complete the path.

2. *Terminating and "Call-Back" connections*

Heretofore it has been indicated that the originating subscriber was connected to an originating register and the identity of the calling substation was stored in the originating register. After the called directory number is dialed, the originating register in accordance with conventional practice engages a marker through an originating register marker connector as shown in FIG. 1B. The register then transmits the line equipment location of the calling line and the directory number of the called substation to the marker. The marker which is equipped to translate the office code determines that the called number is in the same office (assigned to the same marker group as the called line).

The marker then proceeds to perform an intraoffice trunk connection.

As usual, No. 5 crossbar practice consists of two divisible functions: the establishment of a terminating connection, and the establishment of an originating connection often (and heretofore) referred to as a call-back call. The terminating portion of the connection is set up between the called line and the so-called "B" appearance of the intraoffice trunk as shown in FIG. 1B, and the call-back portion of the connection is set up between the calling line and the "A" appearance of the intraoffice trunk.

The terminating connection is always established first to determine if the called line is busy, whereupon the marker may immediately connect the calling line to a busy tone trunk. Before setting up the termanating connection, the marker obtains access through the number group connector and delivers the directory digits of the called number to it. The number group performs its conventional function of translating these digits into an equipment location and delivers this information to the marker together with the appropriate form of ringing. During the interval that the marker is obtaining information from the number group, it also selects an idle intraoffice trunk. The marker then obtains access to the line link frame 143 on which the called subscriber substation is "terminated" (since concentrated lines are involved, all of the terminations are, of course, remote). If the called substation line is free, a terminating connection is set up between the "B" appearance of the intraoffice trunk on the trunk link frame and the called line through a horizontal channel and idle concentrator trunk, for example trunk 2.

Having thus established the terminating connection, the marker then proceeds to set up an originating (call-back) connection between the calling line on line link frame 144 and the "A" appearance of the intraoffice trunk on trunk link frame 145.

Thereafter the marker sets up the ringing selection switch in the terminating connection in accordance with the information obtained from the number group as discussed above, and also releases itself and the originating register from the intraoffice connection. At this time the subscribers are interconnected and the trunk now controls the ringing and supervision of the call.

When ringing signal is applied to the called line termination, apparatus in the applique circuit is energized to determine in the first instance if an intraconcentrator call exists and if so subsequently to disestablish the terminating connection and to connect the called party to the same call-back connection to which the originating party has been connected by the marker after the originating register was released.

In brief, this procedure is instituted on each terminating call by the application of a signal tone (illustratively 5 kc.) from a tone generator shown generally at 146. The tone is applied only to the trunk used in the terminating portion of the connection. Assuming for illustration that trunk 1 is being used for the call-back portion of the call connected to the originating subscriber and trunk 2 to the terminating portion of the call extending to the called subscriber, the tone from generator 146 would be applied to trunk 2. At this time all detectors 147 would be connected to associated individual trunks (except the trunk to which the tone is being applied, namely, trunk 2). If the call is an intraconcentrator call, the tone may be traced from the terminating trunk and a switching channel extending through the intraoffice trunk to the call-back portion of the connection and ultimately to trunk 1. As a result, the specific detector 147 coupled to trunk 1 will be energized and in turn will operate equipment explained in detail herein and outlined generally as transfer circuit 148 in FIG. 1B to release the connection between the called substation and trunk 2. Thereafter the same marking circuitry which originally energized crosspoint 126 in package 120 and the corresponding crosspoint for trunk 2 in package 122 is used to dismiss the connection between trunk 2 and substation 142 at the remote crosspoint and thereafter to establish a connection between trunk 1 and substation 142 at the appropriate remote crosspoint.

At this time substation 124 and substation 142 are interconnected over trunk 1. Supervision of the call is performed in a conventional manner except that both of the substations must go on-hook to cause the trunk to be released as explained in detail herein.

DETAILED DESCRIPTION—INTRACONCENTRATOR CALL

1. *Dial tone—connection*

Figure 2:
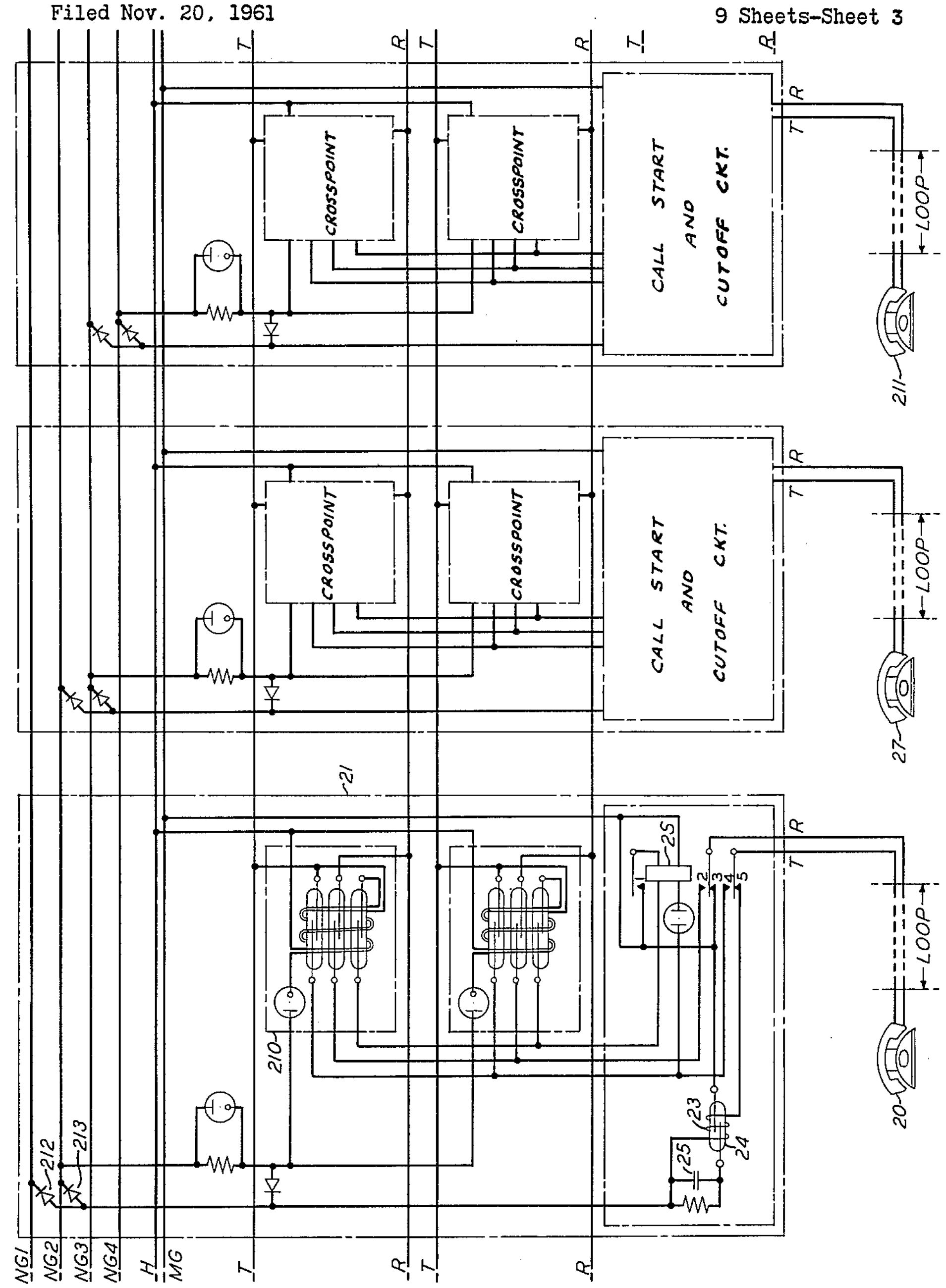

For purposes of illustration it will be assumed that a subscriber at substation 20 (FIG. 2) is initiating a service request. When the substation 20 goes off hook, the switchhook contacts thereat are closed and a path may be traced over the loop from negative batteries 415 and 416, resistances 417 and 418, contacts of relay 6TFR, number group conductors NG1 and NG2, diodes 212 and 213, winding 23, No. 5 contacts of relay 2S, tip conductor of the loop, through the subset 20, ring conductor of the loop, No. 3 contacts of relay 2S, conductor MG to ground in FIG. 4 at the central office.

Current flow through winding 23 described above causes the operation of relay contacts 24 which extends the ground potential from conductor MG to capacitor 25 which, as the latter charges, transmits pulses over the number group conductors NG1 and NG2. These pulses may be traced in the case of conductor NG1 over the contacts of relay 6TFR and capacitor 41 to an electrode of controlled rectifier 4CS1 to energize the rectifier and provide a low impedance path for the operation of relay 4TRSL1 over a circuit including ground, contacts of relay 8S0, winding of relay 4DA, winding of relay 4TRSL1, controlled rectifier 4CS1, contacts of relay 4DA to negative battery.

A similar path may be traced for the operation of relay 4TRSL2. Operation of the translation relays 4TRSL1 and 4TRSL2 results in the operation of a group of relay contacts which ultimately operate a line relay in the central office unique to substation 20. Specifically, a path may be traced (in FIG. 8) from ground, contacts of relays 4TRSL1, 4TRSL2, 7LHT, cable 810, conductor L1, winding of relay 5L1 to negative battery. Relay 5L1 is the conventional existing relay in the line link frame unique to substation 20. Contacts of relay 5L1 extend a path from ground to the start lead ST to the line link marker connector which energizes circuitry in a conventional manner to initiate the connection of a dial-tone marker to the line termination associated with relay 5L1 in the No. 5 crossbar central office. The dial-tone marker operates conventionally to select an idle originating register and an idle channel between the line link frame and the originating register. It will be assumed for purposes of explanation that trunk 1 is idle and as a result the marker selects the channel associated with trunk 1 and causes the operation of select magnet 5SEL0 and mark relay 5MK1 over the normally closed contacts of relay 5MK1 by the application of battery potential in the marker through conventional means not shown herein as not essential to an understanding of the present invention.

Relay 5MK1 locks operated over a path including its own contacts and contacts 522 to negative battery. Contacts 521, 522 and 523 are symbolic representations of the contacts of standard horizontal group relays, the operation of which is disclosed in detail in the above-referred-to Busch patent.

It will be noted that operation of relay 5MK1 results in the operation of relay 4BTS and relay 4ABTS over a path including diode 42 and resistor 43 in the case of relay 4BTS, and the contacts of relay 6DL0 for relay 4ABTS. Operation of relay 4ABTS extends negative 160-volt battery (in FIG. 8) over a path including the contacts of relay 6DL0, contacts of relay 4ABTS, lower winding of relay 8LH0, upper winding of relay 8LH0, resistance 81 to one electrode of tubes 8L7, 8L9, 8L11, etc. At this time, the marker applies a ground potential (shown symbolically by the operation of contacts 56 in the marker) which ground is extended over conductor LP1 and results in the energization of tubes 8L11 and 8L12 over a path including, in the case of tube 8L11, resistance 81, and the path previously traced through the winding of relay 8LH0. A similar path may be traced for tube 8L12.

Energization of tube 8L11 results in a positive voltage excursion at the starting anode of tube 82 which energizes tube 82 and causes the operation of relay 8SUT1 which in turn locks operated over its own contacts and the contacts of relay 4SRL to negative battery. When tube 82 is energized, relay 8LH0 operates over its lower winding in series with tube 82. Relay 8LH0 locks operated over its upper winding and resistance 81 to tube 8L11 and also over resistance 812 to tube 8L12 previously energized. Thereafter, the path extends over conductor LP1, contacts of relay 5LH1 through the winding of relay 5LH1 to negative battery. It will be noted that relay 8SUT2 is operated in a manner similar to that described for relay 8SUT1.

Operation of relays 8SUT1 and 8SUT2 results in the operation of relay 6TFR over a path including ground, contacts of relays 8SUT1 and 8SUT2 in parallel, contacts of relay 6SL0, diode 61, contacts of relay 6DST, winding of relay 6TFR to negative battery. Operation of relay 6TFR results in the transfer of the number group conductors over a path (in FIG. 3) including for conductor NG1, the contacts of relays 6TFR, 8SUT1, 4STG, resistance 311 to positive 70-volt battery. A similar path may be traced for conductor NG2.

It will be noted that when relay 6TFR was operated, an additional path may be traced over the contacts of relays 4SRL, 6DST, resistance 62 to the winding of relay 6DL0 and negative battery. However, relay 6DL0 does not operate at this time in view of the low impedance shunt resistance 63 which diverts current through the contacts of relay 8LH0 to ground. In the interim, the marker circuitry, in accordance with conventional operation, applies low resistance ground to the line hold magnet 5LH1 over conductor LP1 as shown symbolically by the operation of contacts 511. When relay 5LH1 is operated, the normally closed contacts, in series therewith, are opened and the previous path for maintaining gas tubes 8L11 and 8L12 energized is interrupted. It will be noted that tube 82 and the corresponding tube 811 associated with relay 8SUT2 released at the time of operation of relays 8SUT1 and 8SUT2. Relay 8LH0 is also released over the same path. Release of relay 8LH0 interrupts the shunt path described above and permits relay 6DL0 to operate to negative battery over resistance 62.

One result of the operation of relay 6DL0 is application of marking potential to the selected trunk and number group conductors. This path may be traced (in FIG. 4) from −160 volt battery, contacts of relay 6DL0, capacitor 45 and winding of relay 4SCK in parallel, contacts of relays 4SKA, 5MK1, 6TD1, 3TRK1, 5MKA1, 3IS1 to crosspoint 210 in line package 21. The opposite side of the crosspoint is connected to +70 volt potential, as described above, and the crosspoint is energized in the manner described supra and in the above-referred-to Brooks et al. application. It will be noted that the function of capacitor 45 was to charge the trunk conductors for a brief interval prior to the operation of relay 4SCK which latter relay operates upon successful closure of the crosspoint contacts in the remote access switch to verify connection of the calling substation line to the selected trunk, in this case trunk 1.

The operation of relay 6DL0 initiates a timing operation for the operation of relay 4STG. The latter relay will operate if gas tube 4STMG is fired. The time which elapses prior to the firing of 4STMG is determined by the time constant of capacitor 410 and resistance 411 if relay 4SKA is not operated prior thereto. It will be noted that relay 4SKA operates over the contacts of relay 4SCK when the latter relay is operated. Thus, in the timing circuit, relay 4STG is operated at one interval if relay 4SKA is not operated (indicating unsuccessful crosspoint action) and at a shorter interval (over resistance 412 which is smaller in magnitude than 411) if relay 4SKA is operated (indicating successful crosspoint closure).

Operation of relay 4SKA, as described above, disconnects the −160 volt marking potential from the tip and ring conductors of the trunk. In addition, the contacts of relay 4SKA in operating, extend a ground condition over resistors 46 and 47 to the tip and ring conductors of the trunk to dissipate the −160 volt charge thereon over a path which may be traced in the case of the ring conductor from ground, resistance 47, contacts of relays 4SKA, 5MK1, 6TD1, 3TRK1, to the ring conductor of the trunk. In the interim, relay 4SCK remains operated over its own contacts, capacitor 48 and resistance 49. This insures the continued operation of relay 4SCK until relay 4SKA establishes its own locking path over its own contacts and the contacts of relay 6DL0.

Operation of relay 6DL0 also resulted in the operation of relay 4ON which in turn locks operated over a path including the contacts of relay 5MK1, diode 411, contacts of relay 4ON, winding of relay 4ON to negative battery. In addition, operation of relay 6DL0 insures the prevention of any disconnect initiation at this time by opening its contacts in series with the disconnect relay 7DISC1. Moreover, disconnect starting relay 6DST is prevented from operating by the opening of the contacts of relay 6DL0 in series therewith.

In the interim, the operation of relay 4SKA results in the operation of relay 3TRK1 over a path which may be traced from negative battery, winding of relay 3TRK1, contacts of relays 5MK1, 4SKA, and over a parallel path including capacitor 32, previously charged to +140 volts, and resistance 33 to ground (to insure rapid operation of the relay) and over diode 34 which, in effect, provides a holding path after the capacitor 32 has discharged. The trunk relay 3TRK1 functions to provide a connection between the concentrator trunk 1 and the line link frame on which trunk 1 is terminated. Specifically, the contacts of relay 3TRK1 close a path over the tip and ring conductors and the contacts of relays 5MKA1, 6ICTA1 and 6ICTB1 to the tip and ring conductors of the channel extending to the line link frame. At this time, the subscriber is now connected through trunk 1 to the line link frame. Ultimately, an originating register is connected to the line link frame (as described supra) and over trunk 1 to the subscriber and dial tone is transmitted to the subscriber in the conventional manner as described in the Busch patent referred to above. Operation of relay 3TRK1 results in the operation of relay 6TD1 over a path including the contacts of relay 3TRK1.

It will be noted that relay 3TRK1, once operated, locks to ground over a path including diode 35, contacts of relay 3TRK1, sleeve conductor S1 to the line link frame and ground (not shown), applied conventionally to the sleeve conductor of the line link frame when the channel is being used.

Relay 4SRL now operates over a path including the contacts of relays 4STG and 4SKA. Operation of relay 4SRL results in the release of the common equipment in the applique circuit. Relay 8SUT1 is released at the contacts of relay 4SRL. Relay 6DL0 is similarly released. Relay 4SRL is designed as a slow-release relay to insure the release of the appropriate common equipment prior to its own release. Relay 4SRL, itself, releases when relays 4STG and 4SKA release and in turn causes the release of relay 6TFR at the contacts of relay 4SRL.

2. *Extension of terminating connection*

It will be assumed for purposes of further illustration that the subscriber at substation 20 dials the directory number of subscriber 211 connected to the same concentrator. The common equipment in the No. 5 crossbar office operates in a conventional manner to translate the called directory number into an equipment number designating the physical location of the called substation termination and proceeds to effect a connection to the called line termination in the central office. Since the called line is not, in fact, connected directly to the office, the applique circuitry is energized to extend a connection from the called line termination in the central office over a selected idle trunk and the remote crosspoints to the called substation 211. The remote crosspoints (not shown) for substation 211 are energized in the manner described in the preceding section for substation 20.

More specifically, when the marker selects an idle channel to the line link frame (to which the called substation would have been conventionally connected as shown in dotted outline in FIG. 1B), it at the same time selects the corresponding trunk connected thereto. It will be assumed that trunk 2 is idle and available for extension of the connection.

Ultimately, the marker (in FIG. 5) extends a ground condition over conductor MK2 in the conventional manner to operate select magnet 5SEL1 and relay 5MK2 which latter locks operated over the contacts 523 (conventional contacts) in the line link connector circuit. A path may now be traced for the operation of relay 5IST1 from negative battery, winding of relay 5IST1, contacts of relays 5IST1, 6CB1, 7IRL1, 4ON, 5MK2, 5SCB, contacts 521 to ground. Operation of this relay indicates that the call will be assigned an intraconcentrator detector circuit and a test is to be made to determine whether the call being placed is an intraconcentrator call. At this time, the line hold magnet, for example hold magnet 5LH6, is operated through a ground condition applied from the marker in the conventional manner and shown symbolically by the operation of contacts 510. Operation of the line hold magnet also results in the operation of the code translator over conductor LP6 to operate gas tubes 8L1, 8L2 and relays 8SUT3 and 8SUT4 in the manner described above for an originating call and relays 8SUT1 and 8SUT2.

It will be noted that the operation of relay 5MK2, described above, results in the operation of relay 4BTS and relay 4ABTS, the former over diode 42 and resistance 43, and the latter over the contacts of relay 6DL0.

The operation of relays 8SUT3 and 8SUT4 results in the operation of relays 6SCA3 and 6SCA4 over a path including for relay 6SCA3, ground, contacts of relays 8SUT3, 6CB1, 5IST1, winding of relay 6SCA3 to negative battery. A similar path may be traced for relay 6SCA4. Both relays 6SCA3 and 6SCA4 lock over their own contacts and the contacts of relay 7IRL1 to ground.

In view of the previous assumption that an intraconcentrator call may be in effect, relay 6ICTA2 is operated over a path from negative battery, winding of relay 6ICTA2, contacts of relays 5IST1, 5MK2, 4SKA to ground. Relay 4SKA was previously operated as a result of the closure of the crosspoint contacts in the remote switch as described above.

A path may now be traced for the operation of trip detector relay 7TDT1 including the tip conductor of trunk 2 in the line link frame, contacts of relays 6ICTB2, 6ICTA2, conductor T4, contacts of relay 7CNT1, diode 71, winding of relay 7TDT1, contacts of relay 7CNT1, conductor T3, contacts of relays 6ICTA2, 3IS2, tip conductor of the trunk and loop, substation 211, ring conductor of the trunk and loop, contacts of relays 3IS2, 6ICTA2, conductor R3, contacts of relay 7CNT1, additional contacts of relay 7CNT1, conductor R4, contacts of relay 6ICTA2, ring conductor of trunk 2 in the line link frame. This closed circuit trips ringing when substation 211 answers in the standard manner, and in this case also operates relay 7TDT1.

Operation of relay 7TDT1 results in the operation of relay 7CNT1 over diode 72 and, in addition, holds relay 7TDT1 operated (for a predetermined period) over its lower winding, resistance 73 and capacitor 74. Operation of relay 7CNT1 initiates a connection of a signal tone to trunk 2. Relay 7P1 is operated over the contacts of relay 7CNT1, 8TRL1, 7P2, winding of relay 7P1 to negative battery.

It will be noted that two intraconcentrator detector circuits are provided and it is assumed in this case that the first circuit associated with relay 7P1 is idle.

Moreover, the operation of relay 7P1 opens the operating path of relay 7P2 to insure that if more than one trip detector circuit were operated at the same time, the lowest numbered P1 relay would have preference in determining whether an intraconcentrator connection has been established.

3. *Release of originating register and "Call-Back" connection*

As discussed above, after completion of storage of the called directory number in the originating register, a marker was summoned and the called directory number information transferred thereto. At that time, the marker discharged the originating register and established a channel between the originating substation and the called substation in the conventional manner. This includes disestablishing the connection between the calling party and the originating register. The originating subscriber is disconnected in the usual manner from the previous channel to the originating register and a call-back call is initiated in which the marker determines the identity of an idle horizontal channel in the line link frame to which an idle trunk from the concentrator is connected. The marker then completes the channel through the line link frame which in turn initiates the operation of the mark relay (for example, relay 5MK1 if concentrator trunk 1 is still idle) and closes the cross-points at the remote access switch in the manner described above for an originating call.

It will be noted that the applique circuit is equipped to distinguish between call-back calls and terminating calls. Specifically, the ground condition conventionally applied in the marker circuit over the contacts of relay DT (a conventional relay which operates only on originating calls) in the line link connector circuit is extended over diode 51 to the winding of relay 5SCB and negative battery. The contacts of relay 5SCB in series with relays 5IST1 and 5IST2 preclude their operation and therefore the operation of the detector circuit on a call-back call.

4. *Intraconcentrator call detection*

A 5 kc. oscillator, shown in outline form at 75, generates a tone which may be traced over capacitor 76, contacts of relay 7P1, resistors 77 and 78, contacts of relay 7CNT1 in parallel to conductors T4 and R4. The path may be further traced over the contacts of relay 6ICTA2, contacts of relay 6ICTB2 to the tip and ring terminations in the line link frame of trunk 2. Thereafter, the circuit, though not shown (but see FIG. 1B), may be further traced over the intraoffice trunk to the tip and ring conductors of trunk 1, assuming that the latter trunk has been reselected for the call-back portion of the call. Continuing, the circuit may be further traced over conductors T6 and R6 in parallel, contacts of relays 6ICTA1, 6ICTB1, 7LTC, previously operated over the contacts of relay 7P1, to filter detector 1. Current flow through filter detector 1 energizes relay 79 in the filter detector circuit which applies a ground potential to conductor 711 over the contacts of relay 7P1, winding of relay 7TKRA1 to negative battery. Operation of relay 7TKRA1 indicates that an intraconcentrator call is in progress and that the call-back portion of the call has been effectuated over trunk 1. A further path may be traced from the ground condition on conductor 711 and the contacts of relay 7P1 over diode 712, contacts of relay 7DT1, winding of relay 7DT1 to negative battery. The latter relay locks operated over its own contacts and the contacts of relay 7IRL1.

If, in fact, the call being completed was not an intraconcentrator call, timing arrangements in the applique circuit are effective to disconnect the detector equipment and to restore the applique circuitry to the conventional condition exclusive of any connection to the intraconcentrator detector equipment.

Specifically, this timing is performed by relay 6TM1. Operation of relay 7P1 prepares a circuit to operate relay 6TM1 over a path including ground, contacts of relay 7P1 to the center winding of the relay in a direction to cause the operation of the relay. In the interim, the upper winding of relay 6TM1 has been energized over the contacts of relay 7CNT1 in a direction to prevent the relay from operating. Additionally, a circuit may be traced through the lower winding of relay 6TM1 over resistor 64 and capacitor 65, also in a direction to prevent operation of the relay. The latter resistor and capacitor are arranged in a time delay network to preclude the operation of relay 6TM1 for a predetermined time to permit the operation of relay 7DT1 if an intraconcentrator call is detected. The failure of relay 7DT1 to operate during the predetermined interval permits relay 6TM1 to operate which in turn causes the operation of release relay 6ARL1 over a path including the normally open contacts of relay 6TM1 and the normally closed contacts of relay 7DT1. Thus, relays 7CNT1 and 6ICTA2 release at the contacts of relay 6ARL1 in series with the hold circuit thereof. Under these circumstances, the call continues in a conventional manner with a separate terminating trunk and a separate call-back trunk connection.

Since it has been assumed that an intraconcentrator call is in progress, the detect-tone relay 7DT1 will operate prior to the operation of relay 6TM1 and as a result the intraconcentrator detector equipment will continue to function.

Operation of relay 7DT1 causes the operation of relay 7ITN over an obvious path which in turn causes the operation of relay 7CMP. Now a circuit may be traced for the operation of relay 7DISC1 over a path including ground, contacts of relays 7CMP, 6SL0, 7DT1, diode 713, winding of relay 7DISC1 to negative battery. The latter relay locks operated over its own contacts and the contacts of relay 7IRL1. Relay 7CMP seizes the line link connector and prevents its seizure by a marker.

It will be noted in examining the operating path of the intraconcentrator detector equipment that the tone applied by generator 75 which travels through the filter detector connected to the call-back portion of the trunk connection is arranged in a serial circuit. In this manner and as is manifest from the connection of generator 75 to each of the filter detectors of FIG. 7, any current flowing through the filter detector must have originated in the local generator 75 since any current flowing through the filter detector passes through the output transformer of generator 75. This arrangement is particularly advantageous since it precludes the possibility of other generators associated with different intraconcentrator detecting circuits falsely operating detectors in the instant intraconcentrator detector circuit. In short, the serial path for the operation of the filter detector includes all of the appropriate intraconcentrator detector relay contacts 6ICTA- and 6ICTB- in addition to the connect-tone relay contacts 7CNT-. If these relays are not operated, their contacts will correspondingly remain unoperated and the serial path for the connection of a tone signal from generator 75 to the appropriate filter detector will remain incomplete. Moreover in view of the serial connection, any current flowing through filter detector 1 can only find a complete path through generator 75 where it originated. Thus any other concentrator having similar frequency generators will not interfere.

5. *Disconnect function (release of terminating connection)*

Operation of relay 7DISC1 causes the operation of relay 6DST over a path including ground, contacts of relays 7DISC1, 7DISC2, 6DL0, 4SRL, resistance 66, winding of relay 6DST to negative battery. Relay 6DST locks operated over resistance 67, its own contacts and the contacts of relay 6DRL.

Relay 6DON operates over an obvious path as does relay 6TE. In addition, relay 6SL0 operates as does relay 6TMB. Operation of relay 6DST causes the operation of relay 6TFR over an obvious path.

When relay 7DISC1 is operated, a circuit is completed for releasing relay 3TRK2 which was held operated over a path including ground, contacts of relay 7DISC1, 7CNT1, 6ICTA2, 3IS2, 3TRK2, diode 36, winding of relay 3TRK2 to negative battery. At this time a path may be traced (in FIG. 6) from +140 volt potential, winding of relay 6DCK, contacts of relays 6DKB, 6DON, conductor DCK2, contacts of relay 6TD2, contacts of relays 3TRK2, 5MKA2, 3IS2 to the tip conductor of trunk 2. A similar circuit may be traced for the ring conductor from +140 volt, winding of relay 6DCK, contacts of relay 6DBK, contacts of relay 6DON, conductor DCK2, contacts of relays 6TD2, 3TRK2, 5MKA2, 3IS2 to the ring conductor of trunk 2.

Simultaneously, a +70 volt disconnect potential is applied (in FIG. 3) to the number group conductors over a path including resistance 31, contacts of relay 6DST and contacts of relays 8SUT1–8SUT4 in parallel, contacts of relay 6TFR to number group conductors NG1–NG4. The application of the +140 volt potential on the trunk conductors and the +70 volt potential on the number group conductors results in the release of the remote crosspoint in the manner described in the above-referred-to application. At this time the called party has been disconnected from trunk 2. The remaining connection to the central office is from the calling subscriber over trunk 1. It therefore remains to re-establish a connection between the called subscribed and the central office over trunk 1.

When the disconnect function is initiated and current flows through the crosspoint, relay 6DCK is operated.

After the operation of relay 6DCK, a path may be traced for the operation of relay 6DKA from ground, contacts of relays 6DCK, 6DKA, winding of relay 6DKA to negative battery. When relay 6DCK releases due to the release of the remote crosspoint contacts, a further path may be traced over the contacts of relays 6DCK, 6DKA, 6DTG, winding of relay 6DKB to negative battery. Operation of relay 6DKB causes the operation of relay 6DRL over resistance 69. Operation of the latter relay now completes a path for the operation of relay 6FLD over the contacts of relays 7DISC1 and 6DRL. Relay 6FLD locks operated over its own contacts.

Operation of relay 6FLD causes the operation of relay 7CC1 over an obvious path. Operation of relays 6FLD and 7CC1 prepares a path for the operation of relay 7HMT, the hold magnet timing relay, over capacitor 721 and resistor 720.

Operation of relay 7CC1 completes a path for the operation of relay 5MKA1 from negative battery, contacts of relays 7TKRA1, 7CC1, winding of relay 5MKA1 to ground. A path extends further over diode 52, contacts of relay 5MK1 to the winding of relay 5MK1 and in parallel to select magnet 5SEL0.

Operation of relay 7HMT results in the operation of relay 7LHT over a path from ground, contacts of relays 6TDR, 7HMT, winding of relay 7LHT to negative battery.

It will be noted that the operation of relay 7CC1, referred to above, resulted in the operation of relay 8ITR1 over an obvious path.

6. *Transfer of called party to trunk used on "Call-Back" connection*

Figure 3:
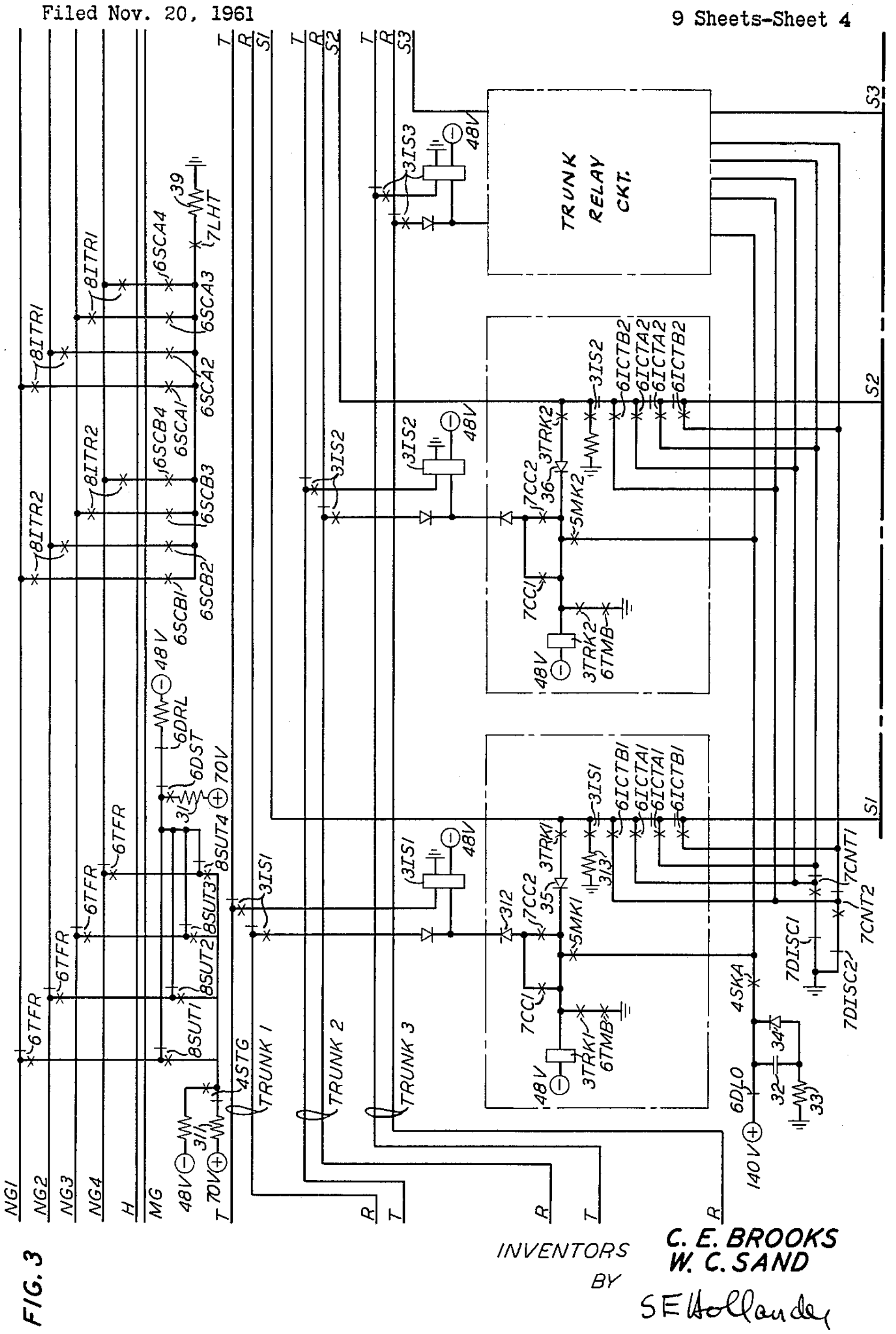

A path may now be traced in FIG. 3 from ground, resistance 39, contacts of relays 7HLT, 6SCA3 and 6SCA4 in parallel, 8ITR1 to number group conductors 3 and 4 in parallel, to energize controlled rectifiers 4SC3 and 4SC4 and to operate relays 4TRSL3 and 4TRSL4. Operation of the latter relays, in turn, extends a path from ground, contacts of relays 4TRSL3, 4TRSL4, 7LHT to line hold magnet 5LH6.

Operation of relay 5LH6 occurs in conjunction with the energization of gas tubes 8L1 and 8L2 in the translator which in turn causes the operation of relays 8SUT3 and 8SUT4. Operation of the latter relays provides a marking path in FIG. 3 from +70 volt potential over resistance 311, contacts of relays 4STG, 8SUT4 and 8SUT3 in parallel, contacts of relays 6TFR to number group conductors NG3 and NG4 uniquely representative of substation 211.

Figure 4:
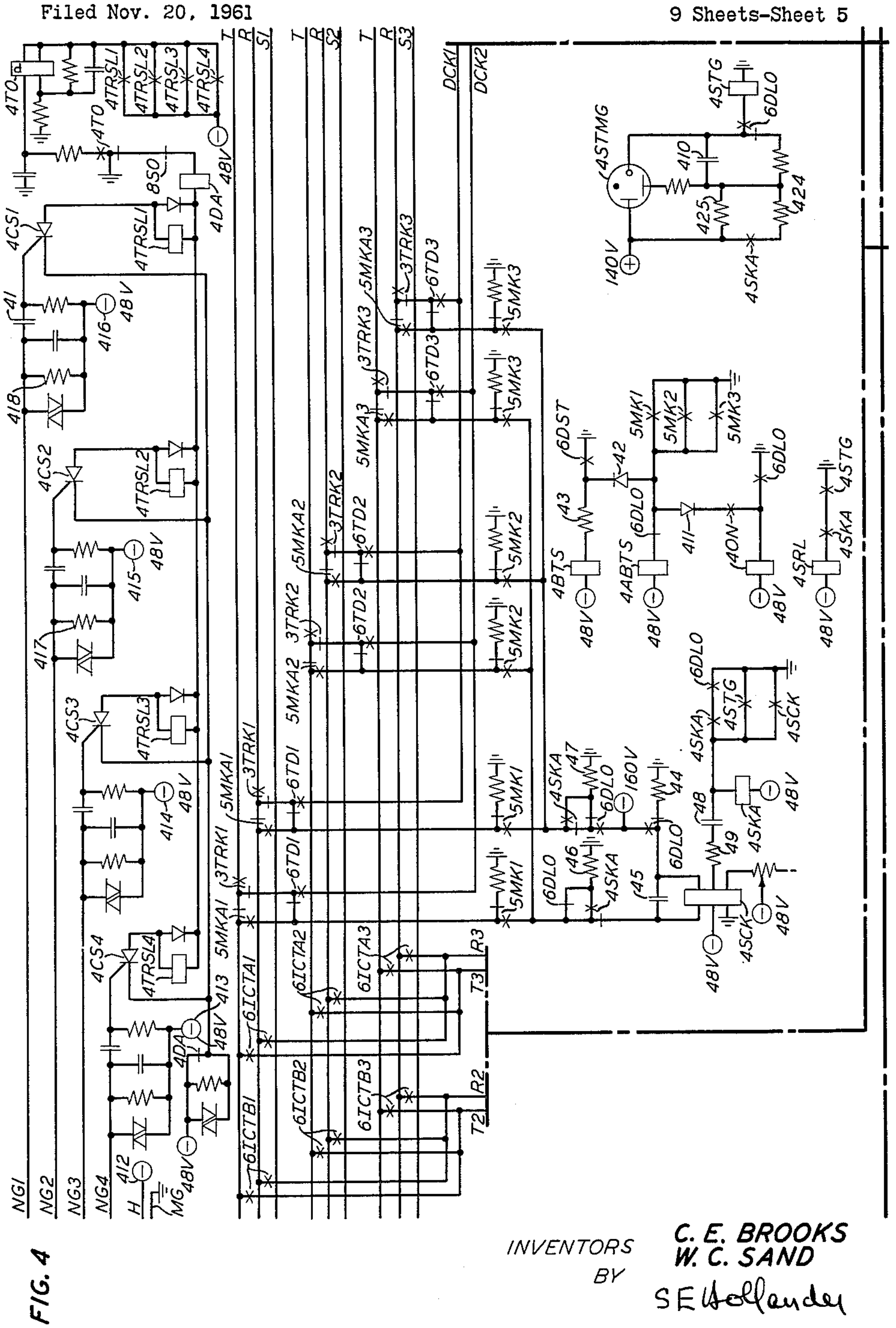
Figure 5:
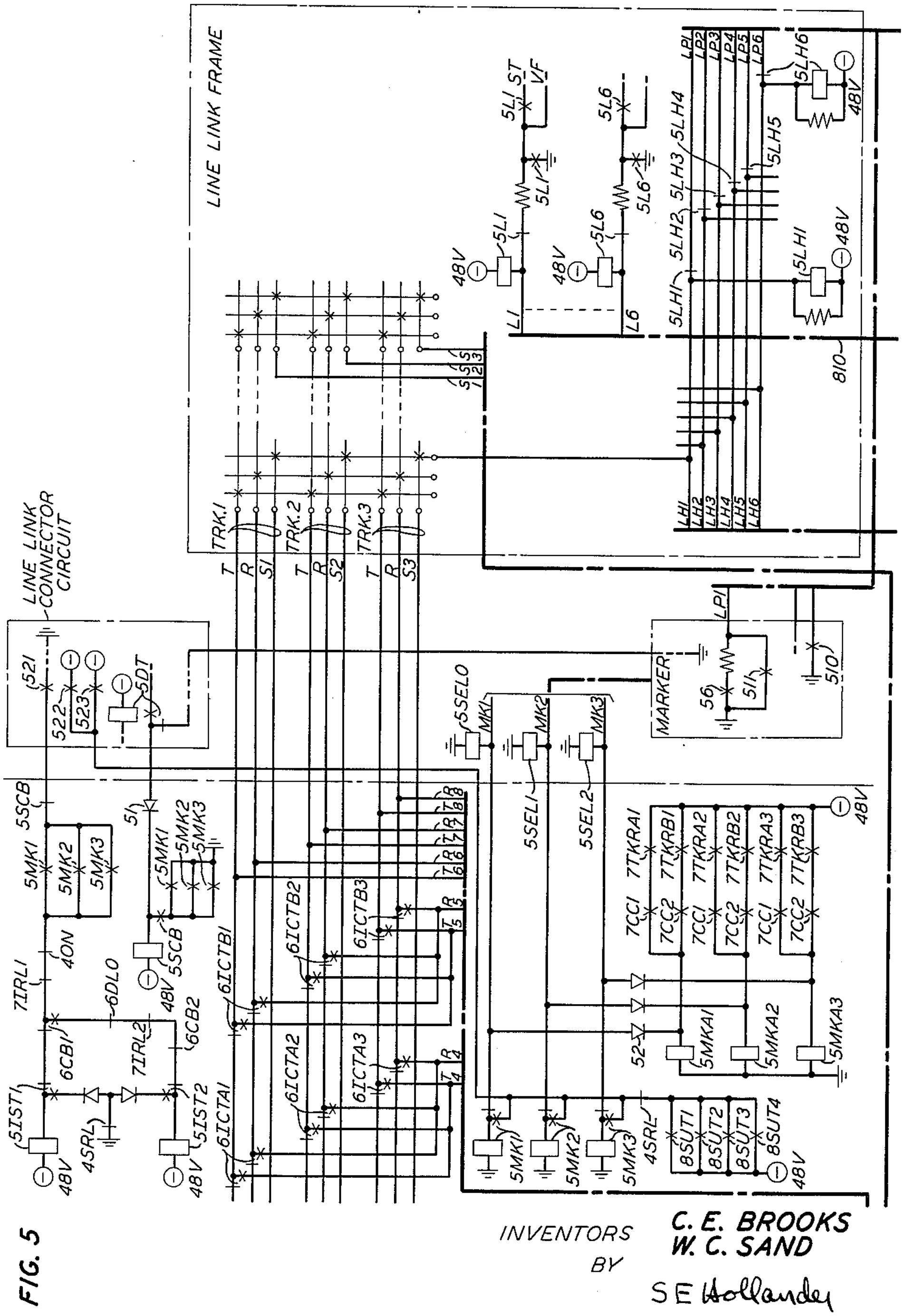
Figure 6:
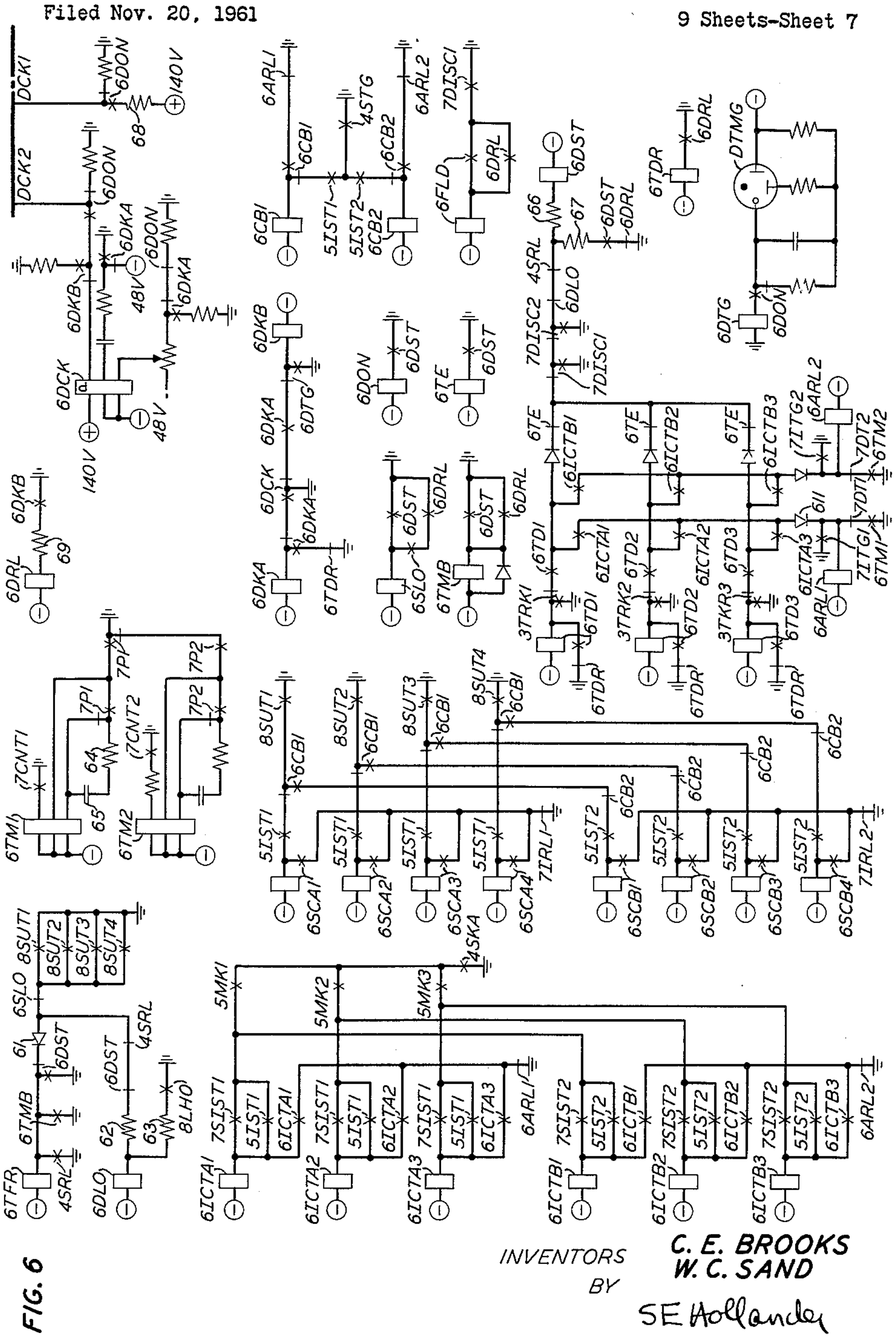
Figure 7:
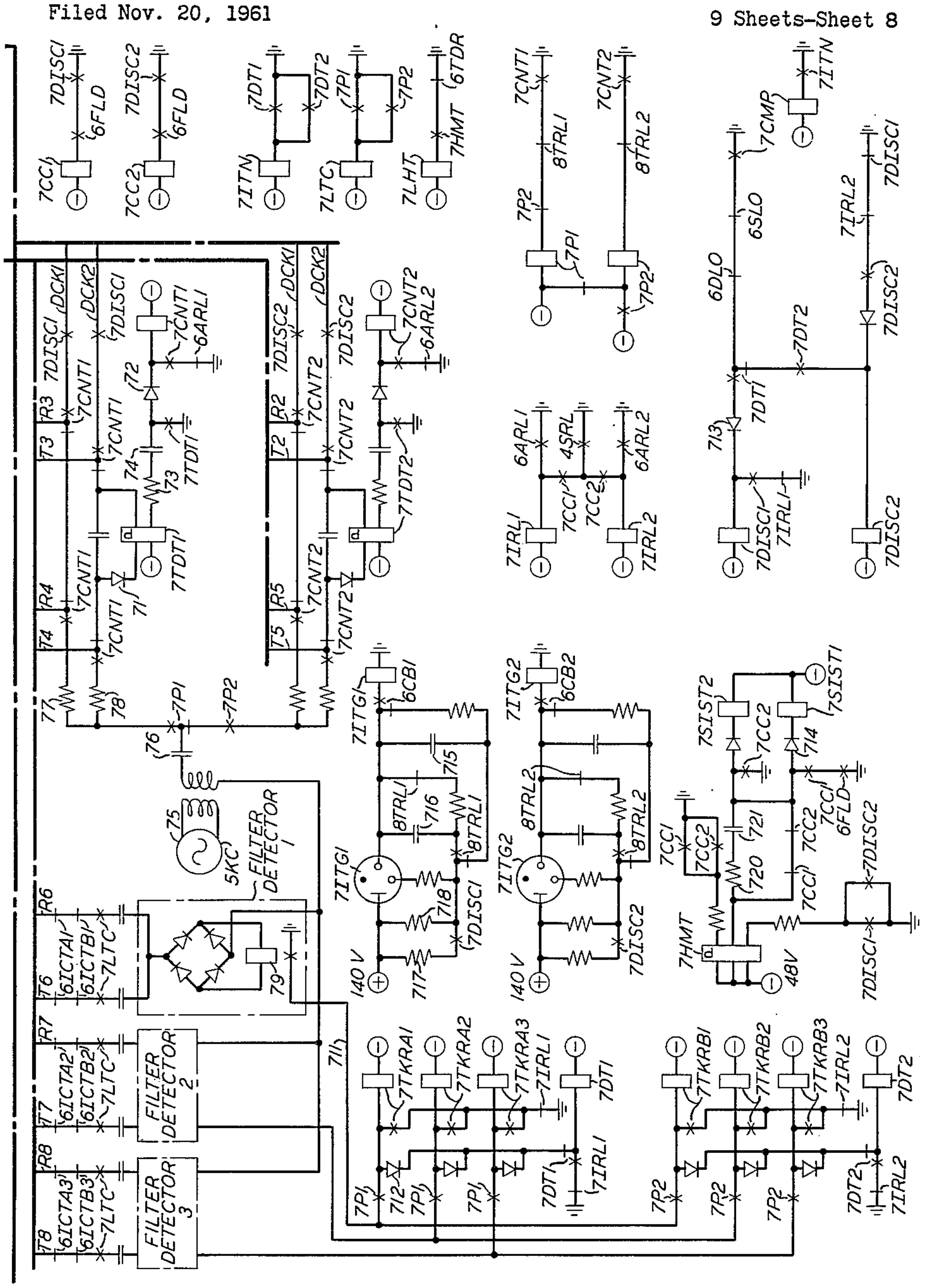
Figures 8, 9:
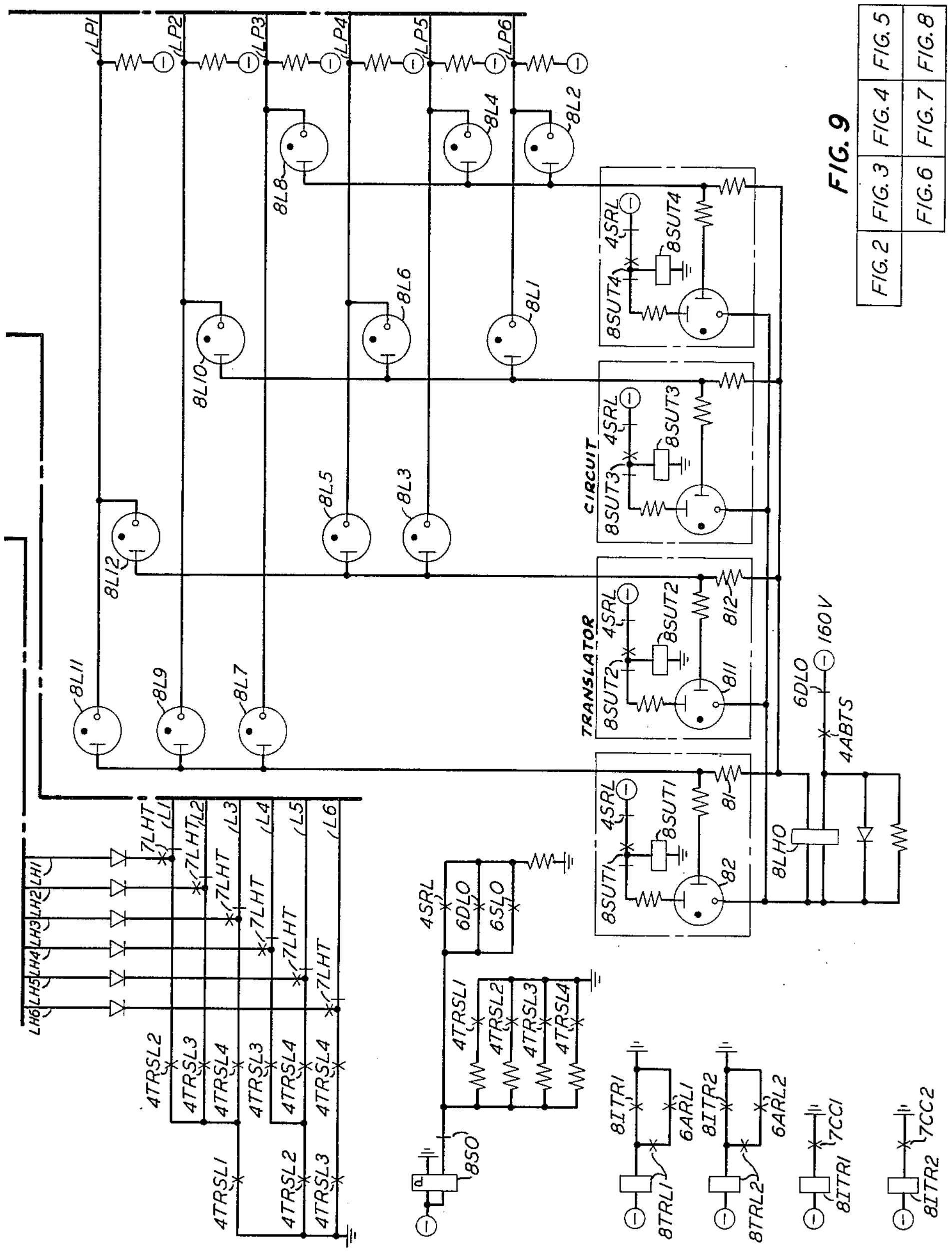
FIG. 8 shows circuitry utilized in line identification and translation.
FIG. 9 shows the relationship of FIGS. 2–8 to advantageously disclose the invention.

At this time a marking potential is applied to trunk conductor 1 in FIG. 4 over a path from −160 volt, contacts of relay 6DL0, upper winding of relay 4SCK, contacts of relays 4SKA, 5MK1, 5MKA1, 3IS1 to the tip conductor of the concentrator trunk. A similar potential appears on the ring conductor over contacts of relays 6DL0, 4SKA, 5MK1, 5MKA1 and 3IS1.

The appearance of the marking potential on the unique number group conductors and the trunk conductor results in the energization of the crosspoints in the remote unit which couple substation 211 to trunk 1 in the manner explained supra. At this time both substations 20 and 211 are coupled to the same concentrator trunk. It will be noted that relay 4SCK operates over the path previously traced and results in the operation of relay 4SKA over an obvious circuit. Operation of the latter relay divorces the −160 volt potential from the tip and ring conductors of the trunk.

Previously, at the time of the operation of relays 6FLD and 7CC1, relay 7SIST1 was operated over diode 714. When relay 4SKA operates, a path is completed for the operation of relay 6ICTA1 from ground, contacts of relays 4SKA, 5MK1, 7SIST1, winding of relay 6ICTA1 to negative battery.

With the operation of relay 6ICTA1, a closed path is established on the originating and terminating ends of the intraoffice trunk to which the subscribers were previously connected. This path may be traced in the case of the terminating portion of the intraoffice trunk from the interconnection of resistances 77 and 78, contacts of relay 7CNT1, conductor R4, contacts of relays 6ICTA2, 6ICTB2, 6ICTA1 and 6ICTB1, to the ring conductor of the intraoffice trunk. A similar path may be traced over conductor T4 to the tip conductor of the intraoffice trunk. As a result, both ends of the trunk are interconnected over resistances 77 and 78, thereby simulating the usual subscriber connection to both ends of the trunk and permitting the conventional revenue charges to be made.

A path for the operation of relay 3IS1 may now be traced (in FIG. 3) from ground, resistance 33, diode 34, contacts of relays 4SKA, 5MK1, 7CC1, diode 312, winding of relay 3IS1 to negative battery. Operation of relay 3IS1 provides the conventional ground potential on the tip conductor and 48-volt talking battery to the ring conductor.

It will be noted that the previous operation of relay 8ITR1 over the contacts of relay 7CC1 causes the operation of relay 8TRL1 which locks operated over its own contacts and the contacts of relay 6ARL1.

Operation of relay 8TRL1 controls the timing circuit including tube 7ITG1 to operate relay 7ITG1 in approximately eight seconds, in lieu of an approximate 43 seconds, in view of the disconnection of capacitor 715 and the insertion in the circuit of capacitor 716. In addition, the resistance on the charging circuit is decreased by the insertion of resistance 717 in parallel with resistor 718. The allocation of revenue charges by a charge entry on an AMA tape or the stepping of a message register will occur approximately two to five seconds after the called party answers. Hence the eight-second interval will insure that the proper charges are registered in the central office equipment.

Operation of relay 7ITG1 causes the operation of relay 6ARL1 over an obvious path when relay 7ITG1 operates after the tube 7ITG1 is energized—approximately eight seconds as described.

7. *Release and hangup*

It will be noted that the setup and marking circuitry previously operated was released at the contacts of relay 7IRL1 including, for example, the release of relay 7DISC1 at the contacts of relay 7IRL1 in series therewith, and the release of any relay 7TKRA- in view of the contacts of relay 7IRL1 in series therewith. Relay 7DT1 also releases.

It will be noted that after the illustrative eight-second interval has elapsed and relay 7ITG1 is operated, relay 6ARL1 operates over an obvious path initiating the release of the equipment utilized in the intraconcentrator detector function including, for example, the release of relay 7CNT1 at the contacts of relay 6ARL1 and relays 6ICTA1 and 6ICTA2 in view of the interruption of the holding path therefor. It will be noted that relay 3IS1 and relay 3TRK1 remain operated. Relay 6TD1 remains operated for the duration of the connection between subscribers 20 and 211. Also at this time the ground is removed from the sleeve of the link, permitting the link and the concentrator trunk 2 (the called connection had been assigned to) to test idle and be reused for another call. Also the intraoffice trunk circuit is released at this time in the conventional manner.

When both of the subscribers disconnect, relay 3IS1 releases over an obvious path and initiates the release of relay 3TRK1 in view of the opening of the contacts of relay 3IS1 in series with resistance 313, and concurrently line hold magnets 5LH1 and 5LH6 are released in view of the removal of ground condition from the sleeve conductor at the same contacts of relay 3IS1.

When relay 3TRK1 is released, a disconnect function is initiated in the manner described in detail above.

It will be noted that in the event that a connection was established and ringing was applied to the called substation, the disconnection by the calling party will initiate an immediate disconnect operation over a path which may be traced from ground, contacts of relays 6TDR, 6TD2, 3TRK2, 6TD2, 6ICTA2, diode 611, winding of relay 6ARL1 to negative battery, thereby initiating release of the detector circuitry in the manner described above.

From what has been demonstrated heretofore concerning the interconnection of substations 20 and 211 to the same concentrator trunk, it will be apparent that the usual number of intraconcentrator calls heretofore available has been doubled. Thus in prior arrangements where two distinct concentrator trunks, one for the originating portion of the connection and the other for the terminating portion of the connection, were required on each call, all ten concentrator trunks were required to service only five intraconcentrator calls. This, of course, would prevent any other subscribers from gaining access to the concentrator switching unit. In fact, a situation would arise which is scrupulously avoided by all telephone technologists, i.e., the subscriber would be presented with a "dead" line—he would receive no dial tone.

Since only five concentrator trunks need be pressed into service for five intraconcentrator calls between ten concentrator substations, the remaining forty subscribers connected to the same concentrator have access to the concentrator to utilize the remaining five trunks in effecting calling connections.

It is to be understood that the above-described arrangements are illustrative of the application of the principles of this invention. Numerous other arrangements may be devised by those skilled in the art without departing from the spirit and scope of the invention.

What is claimed is:

1. A telephone line concentrator system including a central office, a plurality of trunks connected to said office, a plurality of substations remote from said office, remote switching means for connecting said substations to said trunks under control of said central office, and means in said central office responsive to the establishment of a connection between said substations over two of said trunks for connecting said substations to a single one of said trunks.

2. A telephone line concentrator system including a telephone central office, a plurality of trunks connected to said office, a plurality of remote substations, remote switching means for connecting said substations to said trunks under control of said central office, said switching means including means for effecting a connection between a calling and called one of said substations by extending said calling substation over one of said trunks to said central office and said called substation over another of said trunks to said central office, and means at said central office responsive to said connection for releasing said trunk extending to said called substation.

3. A line concentrator system including a telephone central office, a plurality of speech trunks connected to said office, a plurality of remote substations, switching means remote from said office and governed by said office to connect said substations to selected idle trunks, means in said central office responsive to a calling condition at one of said substations for controlling said switching means to extend said calling substation over one of said trunks to said office, means at said office responsive to the transmission of information representing the called substation identity for controlling said remote switching means to extend a connection to said called substation over another one of said trunks, and additional means in said office responsive to the detection of an intraconcentrator connection for releasing said trunk extending to said called substation and for reconnecting said called substation and said calling substation to a single trunk.

4. A remote line concentrator system including a central office, a plurality of speech trunks extending from said office, a greater plurality of substations remote from said office and from each other, a plurality of concentrator units individual to said substations and disposed along the length of said trunks in contiguity to said substations, said units including crosspoint means for switching said substations to said trunks under control of said central office, and means at said central office responsive to the detection of an intraconcentrator calling condition between two of said substations over two of said speech trunks for governing said crosspoint means to release one of said two trunks.

5. A remote line concentrator in accordance with claim 4 including in addition means responsive to the release of said one trunk for connecting both of said substations to said other trunk.

6. An automatic telephone line concentrator system including a telephone central office, a plurality of remote substations, a smaller plurality of concentrator trunks connected to said telephone central office, a plurality of remote switching units individual to said substations, said units being physically disposed in a multiplicity of locations contiguous to said substations, means at said units responsive to a service request indication at an associated substation for transmitting information to said central office indicative of the calling substation identity, means at said central office for controlling said units to establish a connection between said calling substation and a selected idle trunk, additional means in said central office responsive to the transmission of information identifying a called substation for governing said remote units to establish a connection to said called substation over another idle trunk, and additional means in said central office effective when said calling and called substations are coupled to the same concentrator system to release said other idle trunk and to reconnect said calling and called substations to the same trunk.

7. An automatic telephone line concentrator system including a telephone central office, a plurality of remote substations, a lesser plurality of speech trunks, a plurality of remote switching means individual to said substations and disposed along the length of said trunks in accordance with the relative physical location of said substations, means at said central office responsive to a calling condition at one of said substations for governing said remote switching means associated with said calling substation for extending a dialing connection from said calling substation over a first of said speech trunks to said office, register means in said office responsive to the transmission of dialed information for storing the called directory number digits representative of a called substation, means responsive to the completion of said storage in said register means for releasing said dialing connection, means in said central office for governing said remote switching means associated with said called substation for extending a terminating connection over a second of said speech trunks to said called substation and for governing said remote switching means associated with said calling substation for extending a "call-back" connection over another of said trunks to said calling substation, means in said office for applying a signal tone to said second trunk, and detecting means connectable to all of said speech trunks and responsive to the appearance of signal tone on said trunk used in said "call-back" connection.

8. An automatic telephone line concentrator system in accordance with claim 7 including in addition means at said office effective upon detection of said tone on said trunk used in said "call-back" connection for governing said remote switching means associated with said called substation for disestablishing the connection between said called substation and said trunk used in said terminating connection.

9. An automatic telephone line concentrator system in accordance with claim 8 including in addition means at said office responsive to the release of said second trunk used in said terminating connection for governing said remote switching means associated with said called substation for establishing a connection between said called substation and said trunk used in said "call-back" connection.

10. A telephone line concentrator system including a telephone central office, a plruality of trunks extending from said office, a plurality of substation lines remote from said office, remote switching means for connecting said lines to said trunks under control of said central office, means in said central office responsive to the initiation of an intraconcentrator connection between calling and called lines connected to said remote switching means for extending said lines to said office over selected idle trunks individual to said lines, additional means in said office for detecting the establishment of said intraconcentrator connection and transfer means operative in response to the operation of said detecting means for releasing said one of said trunks connected to said called substation line including means for storing the identity of said called substation line subsequent to the release of said trunk connected thereto.

11. A telephone line concentrator system in accordance with claim 10 wherein said detecting means includes means for applying a tone frequency to said trunk connected to said called line and means for sensing the remaining trunks for the presence of said tone.

12. An automatic telephone line concentrator system including a telephone central office, a plurality of substation lines remote from said office and from each other, a plurality of trunks extending from said office, remote switching means individual to said substation lines and distributed along the length of said trunks contiguous to the associated substations, means at said central office responsive to a calling condition at one of said substations for extending a connection over a selected idle one of said trunks to said office, registration means at said office responsive to the transmission of dialed information representative of a called substation over said one trunk, additional means in said office for extending a connection between said calling and called substations over a selected pair of said idle trunks, intraoffice trunk means in said central office for completing the connection, detector means in said office responsive to the completion of said connection for indicating an intraconcentrator calling connection, means responsive to the operation of said detector means for releasing said trunk connected to said called substation and for releasing said intraoffice trunk means, additional means responsive to the operation of said detector means for reconnecting said called substation to said trunk connected to said calling substation, and additional means including a plurality of bistable devices for identifying the trunk extending to said calling substation.

13. A distributed telephone line concentrator system including a telephone central office, a plurality of speech trunks extending from said office, a plurality of signal trunks extending from said office, a greater plurality of substations remote from said office, a plurality of remote switching means individual to said substations and physically disposed along the length of said trunks contiguous to said associated substations, means responsive to a calling condition at one of said substations for energizing said remote switching means to activate a unique group of said signal trunks connected to said calling substation, means at said central office responsive to the activation of said signal trunks for extending a connection over a selected idle one of said speech trunks to said calling substation, additional means in said office responsive to the transmission of dialed information indicative of a called substation connectable to said speech trunks for releasing said selected idle trunk and for establishing a connection between said calling and called substations over a selected pair of idle speech trunks, detecting means connectable to said speech trunks for indicating an intraconcentrator connection, additional means responsive to the detection of the existence of said intraconcentrator connection for releasing said trunk connected to said called substation including means for activating said signal trunks and said speech trunk to release said connection, and transfer means responsive to the operation of said detecting means for reconnecting said called substation to said trunk extending to said calling substation.

14. An intraconcentrator call detector circuit for use in conjunction with a telephone concentrator system wherein a plurality of remote substations are connectable to a telephone central office over a lesser plurality of trunks characterized by said detector circuit including means responsive to the interconnection of a plurality of said substations over two of said trunks for applying an identifying signal to one of said trunks, and indicating means connectable to each of the remaining trunks and responsive to the reception of said identifying signal to indicate the identity of the concentrator trunk with which said trunk is interconnected.

15. In a telephone switching system an intraconcentrator detector circuit comprising identifying signal generating means, filter detector means, and means for interconnecting said generating means and said filter detector means in a serial circuit to preclude the operation of said detector means by signals other than those generated by said identifying signal generating means.

16. A distributed telephone line concentrator system including a telephone central office, a plurality of speech trunks extending from said office, a plurality of signal trunks extending from said office, a greater plurality of substations remote from said office, a plurality of remote switching means individual to said substations and physically disposed along the length of said speech trunks and signal trunks, means at said office responsive to a calling condition at one of said substations over said signal trunks for governing said remote switching means individual to said substation to connect said calling substation to a first of said speech trunks, means at said office responsive to information signals transmitted from said calling substation indicative of another of said substations for governing said remote switching means individual to said other substation to extend a connection to said substation over a second of said speech trunks, means at said office for releasing said first trunk previously connected to said calling substation and for reconnecting said calling substation over a third of said speech trunks to said office, intraoffice trunk switching means in said office for coupling said second and third speech trunks, intraconcentrator detector means in said office for identifying said interconnection as an intraconcentrator call, means responsive to said detector means for disestablishing the connection between said other substation and said second speech trunk, and addition means effective upon the release of said connection for reconnecting said other line to said third speech trunk.

17. A distributed telephone line concentrator system in accordance with claim 16 including, in addition, means responsive to the release of said connection for releasing said intraoffice trunk.

18. A distributed telephone line concentrator system in accordance with claim 16 wherein said intraconcentrator detector means includes generator means serially connectable to said second speech trunk, detector means serially connectable to each of said remaining speech trunks and responsive to the operation of said generator means for identifying said interconnection as an intraconcentrator call, and means for precluding the operation of said detector means in response to other than said generator means.

19. A distributed telephone line concentrator system in accordance with claim 18 including, in addition, unidirectional conducting means connected intermediate said generator means and detector means.

20. An intraconcentrator detector circuit for use in a telephone switching system wherein a plurality of remote substations are coupled over a lesser plurality of speech trunks to a telephone office comprising means at said office for applying a marking condition to speech trunks utilized in terminating connections, additional means connectable to said remaining speech trunks for detecting said marking condition to indicate the trunk utilized for connection to the calling substation, and indicator means connected to said detector means to indicate the existence of an intraconcentrator call.

21. An intraconcentrator detector circuit for use in a telephone switching system in accordance with claim 20 wherein said means for applying said marking condition and said detector means are serially interconnected to preclude the operation of said detector means by other than said generator means.

References Cited by the Examiner

UNITED STATES PATENTS

| | | | |
|---|---|---|---|
| 2,037,221 | 4/36 | Evers | 179—18 |
| 2,244,911 | 6/41 | Jauch | 179—18 |
| 2,850,577 | 9/58 | Krom | 179—18 |
| 2,951,907 | 9/60 | Marzin | 179—18 |
| 3,070,666 | 12/62 | Brooks et al. | 179—18 |

ROBERT H. ROSE, *Primary Examiner.*

THOMAS B. HABECKER, *Examiner.*